Dec. 20, 1938.     J. C. McCUNE     2,140,643
MAGNETIC TRACK BRAKE
Filed Sept. 12, 1936
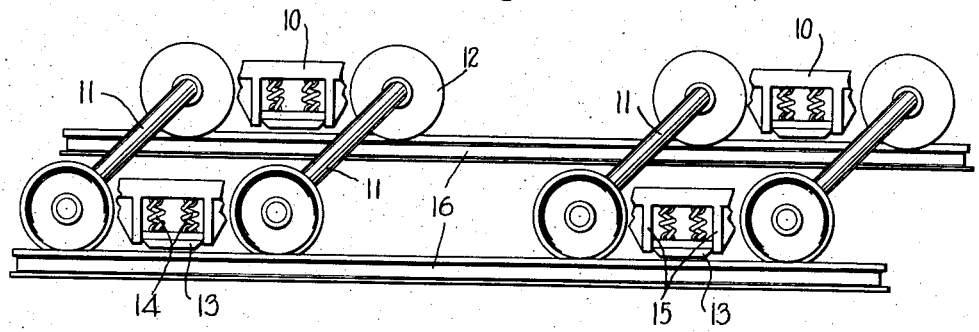
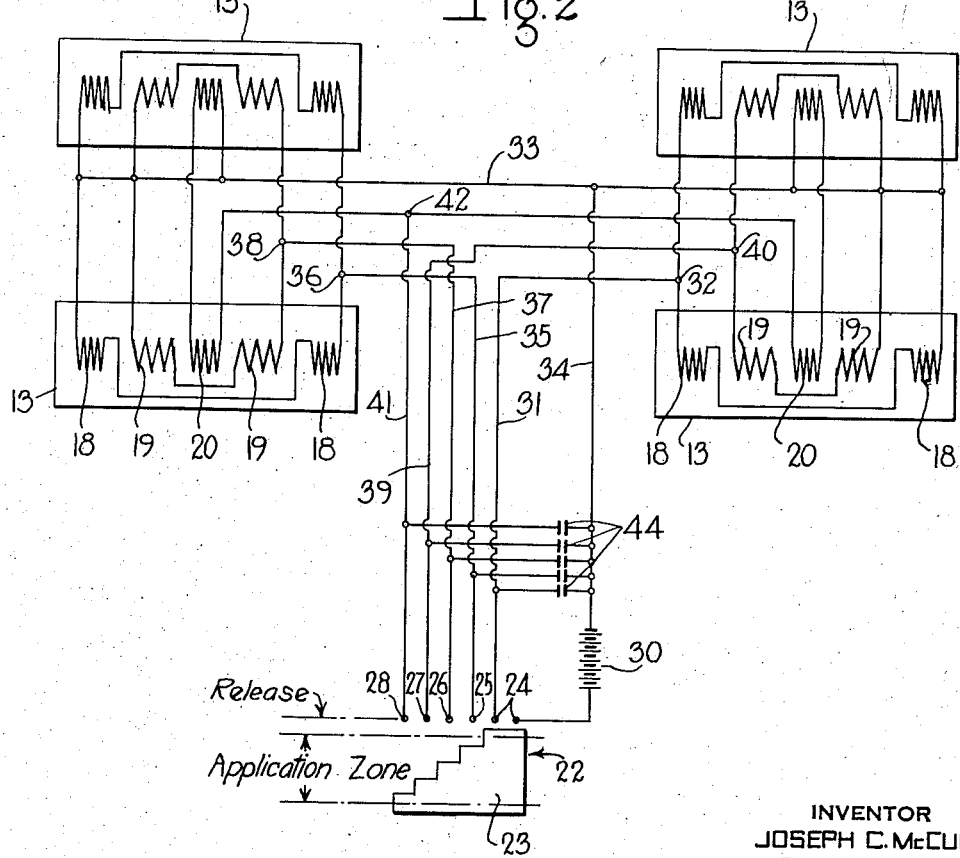
INVENTOR
JOSEPH C. McCUNE
BY *Wm. M. Cady*
ATTORNEY Patented Dec. 20, 1938

2,140,643

UNITED STATES PATENT OFFICE 2,140,643

MAGNETIC TRACK BRAKE

Joseph C. McCune, Edgewood, Pa., assignor to The Westinghouse Air Brake Company, Wilmerding, Pa., a corporation of Pennsylvania Application September 12, 1936, Serial No. 100,494

5 Claims. (Cl. 188—165)

This invention relates to magnetic track brakes, and more particularly to an improved variable control for a magnetic track brake system.

The public demand for quiet operating traction vehicles has made it necessary to employ rubber or similar inserts in the vehicle wheels in order to reduce wheel noise. When such inserts are employed the braking on the wheel treads must be limited to moderate values for repeated brake application, or the inserts will be damaged beyond usefulness. Since the degree of braking which may be produced on the wheel treads must be thus limited it has become the practice to employ magnetic track brakes in order to produce the desired total degree of braking.

While magnetic track brakes have been successfully employed over many years, certain disadvantages have arisen in connection with controlling the degree of application of such brakes. The magnetic track shoes are preferably suspended from the vehicle truck a short distance above the track rails by springs, and are attracted to the rails when energized to produce a braking effect. Heretofore, the chief method employed for controlling the energization of the several track shoes has been to vary resistance in circuit with the shoes. When resistance is employed, not only is the power loss therein uneconomical but difficulty has been experienced in obtaining uniform increases in the degree of braking, because while the current may be uniformly increased the degree of braking produced does not necessarily increase proportional to the uniform increase in current.

A principal object of the present invention is to provide a variable control for magnetic track brakes which does not require a variable resistance, and which consequently is free of the power losses and other disadvantages incident to the use of resistance.

One of the particular disadvantages encountered in track brake systems heretofore has been in obtaining a satisfactory graduated control for service applications of the brakes, while at the same time providing a maximum degree of braking for emergency applications. In order to produce a short stop in an emergency application, it is desirable to obtain the maximum possible braking which a magnetic track shoe of a given length can produce. This requirement for emergency applications conflicts with the graduating control requirement for service applications, because if the shoe is designed with a single energizing winding to meet the emergency condition, a small amount of current only is required to produce the maximum degree of braking. This current value is generally so small that it is not practical to attempt to energize the shoe in steps at smaller current values in order to obtain the lower graduated braking required for service applications.

In carrying forward my invention, I have found that if each of the track shoes is provided with a plurality of separate windings and the windings of several shoes are properly connected with each other, and with a controller, that variable degrees of braking may be obtained in smooth and regular steps, without the employment of any external resistance, and at the same time not sacrifice the maximum braking required for emergency applications.

It is therefore a further object of my invention to provide an improved magnetic track brake system employing magnetic track shoes having multiple windings, and a variable control therefor for effecting various degrees of braking in a smooth and economical manner.

A principal field of application of the magnetic track brakes at the present time is to traction vehicles operating in metropolitan areas and between urban communities. Such vehicles must be started and stopped frequently and the control for the brakes must be simple and reliable in character. It is therefore a further object of my invention to provide an improved magnetic track brake system and a variable control therefor particularly adaptable for traction vehicles.

Other objects and advantages of the invention will be apparent from the following description, which is taken in connection with the attached drawing, wherein Fig. 1 shows in schematic form a preferred location of magnetic track brake shoes on the trucks of a two-truck traction vehicle.

Fig. 2 illustrates in schematic form the multiple windings of each magnetic track shoe and the connections therebetween and with a brake controller.

Referring now first to Fig. 1, I have indicated each of the vehicle trucks by the fragmentary structural portions 10, which as is well understood in the art, supports the axles 11 upon which are mounted the vehicle wheels 12.

Suspended from the vehicle truck 10 are four magnetic track brake shoe devices 13. Each of these devices is suspended from the truck by two springs 14, and is centered between guides 15 directly over and at a small distance above a track rail 16. I prefer to dispose each of the track-shoe devices between the two axles 11 on each truck, as this tends to produce minimum abnormal stresses in the truck. In addition, in this location the track shoe devices can be more readily maintained in alignment with each track rail.

The track shoe devices 13 are preferably of the commonly known type referred to as the parallel shoe type. That is to say, each of the track shoe devices comprises two rail-engaging shoes in spaced parallel arrangement extending longitudinally of the track rail. The two parallel rail-engaging shoes of each device are connected by a core member upon which is customarily disposed a single energizing winding.

Referring now to Fig. 2, instead of employing a single energizing winding, I propose to provide each shoe device with a plurality of separate windings, as is diagrammatically indicated at 18, 19 and 20. As illustrated, I propose to connect the two windings 18 of each shoe device in series, and similarly with the two windings 19. These two groups of windings are, it is to be noted, maintained separate, that is there is no electrical connection between them except as is afforded by the brake controller, which will be presently described. The same also applies for the single winding 20.

The several windings 18, 19 and 20 of each shoe device are preferably disposed on the same magnetic core, either concentrically, in end-to-end relation, or in any other suitable relation such that the magnetism produced increases as additional windings are energized. This arrangement gives particularly good results with the parallel pole-shoe type of track shoe device, and I consider that the preferred type.

I have found from experience and experimentation that the number of turns or convolutions of each winding, or group of windings, will generally differ from the other. That is to say, when the same value of current is flowing in each of the windings the ampere-turns represented by the group of two windings 18 will generally be different from the ampere-turns represented by the group of two windings 19. In a similar manner, the ampere-turns represented by the single winding 20 will be different from the ampere-turns of the other two groups. This difference in the number of turns or convolutions is necessary in order to obtain smooth increments of braking as the windings are successively energized.

The windings of the several shoe devices 13 are interconnected and successively energized as will be more fully described presently in the description of operation of this embodiment of my invention.

A brake controller device is indicated diagrammatically in the usual way at 22. This device may comprise a stepped contact segment 23, preferably of the drum type, which when rotated first engages and connects together two contact fingers 24, and then successively engages contact fingers 25 to 28 inclusive.

The brake controller is illustrated in its release position, and may be moved different degrees into an application zone, as by movement of a handle (not shown), so that the segment 23 may engage different ones of the contact fingers 25 to 28.

The source of current supply for energizing the windings of the track shoe devices may be any of those commonly employed, as for example from a trolley, a motor generator, or a battery. For the purpose of illustration a battery has been indicated at 30. When a battery is employed the elimination of control resistances is especially desirable, as undue loss of power necessitates too frequent recharging of the battery.

*Operation*

When it is desired to effect an application of the magnetic track brakes, the brake controller 22 may be operated to any position in the application zone.

Assuming now that the brake controller has been operated to its first application position, where segment 23 bridges the contact fingers 24, a circuit will be established from the battery 30 to the two groups of windings 18 in the two right hand shoe devices 13. This circuit may be traced from the battery 30 as including the contact fingers 24 bridged by segment 23, conductor 31, junction point 32, at which point the circuit branches, one branch including the two coils 18 of the lower right hand shoe device 13, and the other branch including the two coils 18 of the upper right hand track shoe device 13, the return circuit for both groups being by way of conductors 33 and 34.

It will thus be seen that for the first application position of the brake controller the coils 18 in the two right hand shoe devices only will be energized. These two shoe devices will be pulled by their own magnetism to engagement with the track rail 16 and will produce a minimum braking effect on the one truck only.

Assuming now that the brake controller is moved to the second application position, the segment 23 will engage the contact 25 to establish by way of conductor 35, and junction point 36, a circuit to the windings 18 in each of the two left hand shoe devices 13. These two shoe devices will then be attracted to the rails to produce a minimum braking effect by each on the other truck. The braking effect produced on the car itself in the second application position of the brake controller may be any desired practical increase over that produced in the first position.

Assuming now that the brake controller is moved to the third application position, a circuit will be established by way of conductor 37, and junction point 38, to the two coils 19 in each of the two left hand brake devices 13. Energization of these two groups of windings will cause the two left hand shoe devices 13 to produce an increased degree of braking by a chosen increment, which as before explained is determined experimentally or can be calculated from data previously obtained by experimental means.

Assuming now that the brake controller is moved to its fourth application position, a circuit will be established by way of conductor 39, and junction point 40, to the two groups of windings 19 in the two right hand shoe devices 13. These two shoe devices will then produce the same increase of braking as were produced by the two left hand shoe devices when their windings 19 were energized; or, if desired, this increase could be made different by suitably designing the winding groups.

Assuming now that the brake controller is moved to its fifth and last position, a circuit will be established by way of conductor 41, and junction point 42, to each of the windings 20 in each of the track shoe devices 13. Each of the shoe devices will then preferably produce a like increase (or different, if desired) in the degree of braking. The track brakes will in this position of the brake controller be applied to the maximum degree.

It should now be apparent that by suitably designing the winding groups in each track shoe device, that the progressive moving of the brake controller handle into the application zone will produce regular and predetermined increases in the degree of braking, so that the vehicle may be decelerated smoothly and without undue discomfort to the passengers. This smooth deceleration is accomplished by making the turns in each of the winding groups 18, 19 and 20, of each brake shoe device, such that as these windings are successively energized the degree of braking increases by predetermined steps.

If after moving the brake controller 22 to any application position, it is desired to decrease the degree of braking the brake controller may be moved toward its release position as desired. As the brake controller contact segment 23 disengages from one or more of the contact fingers 24 to 28, one or more of condensers 44 function to diminish the arcing which would normally take place, and thereby prolong the life of the contacts.

When it is desired to wholly release the magnetic track brakes the brake controller is moved to the release position, whereupon all of the windings in each track shoe device will be deenergized.

It will be particularly noted with respect to each truck that due to the manner in which the several windings of each track shoe device on a given truck are connected to the corresponding windings in the other track shoe device on that truck, and to the brake controller, the braking on both sides of the truck is at all times equalized so that no unbalanced stresses are produced in the truck. Furthermore, by increasing the braking first on one truck and then on the other, each truck shares the total braking load.

While I have described my invention with particular reference to one specific embodiment thereof, it is not my intention to be limited to this embodiment or otherwise than by the spirit and scope of the appended claims.

Having now described my invention, what I claim as new and desire to secure by Letters Patent, is:

1. In a vehicle brake system, in combination, a plurality of track brake shoe devices an equal number of which are mounted on different vehicle trucks, each of said track shoe devices comprising a plurality of energizable windings, a brake controller device operable to different application positions, and means connecting said brake controller device with the windings in said plurality of track shoe devices, so arranged that as said brake controller device is operated to successive application positions part of the windings in the track shoe devices associated with one vehicle truck are first energized and then part of the windings associated with the track shoe devices of the other vehicle truck are next energized, and so on until all shall have similarly been energized.

2. In combination, a plurality of vehicle trucks, a magnetic track brake device mounted on each truck, each of said track shoe devices having a plurality of energizable windings, a brake controller device operable to various application positions, and means for energizing first some of the windings in one of said track brake devices and then some of the windings in the other of said track brake devices, alternately, until all of the windings in both of said track brake devices shall have been energized as said controller device is moved to the last of its application positions.

3. In a vehicle brake system, in combination, two vehicle trucks, two magnetic track brake devices associated with each of said trucks, each of said magnetic track brake devices having a plurality of independent energizable windings, a brake controller device movable from a release position through various application positions to a maximum application position, and means for energizing first some of the windings on the two track brake devices associated with one truck, then some of the windings on the two track brake devices associated with the other truck, then more of the windings on the track brake devices associated with the first truck, then more of the windings on the track brake devices associated with the second truck, and so on until all of the windings shall have been energized when the brake controller device reaches the maximum application position.

4. In a magnetic track brake system, in combination, a first magnetic track shoe device adapted to be mounted on one truck of a vehicle, a second magnetic track shoe device adapted to be mounted on a different truck of the same vehicle, each of said magnetic track brake devices having a plurality of independent energizable windings, a first circuit for energizing some of the windings in said first shoe device, a second circuit for energizing some of the windings in said second shoe device, a third circuit for energizing more of the windings in said first shoe device, a fourth circuit for energizing more of the windings in said second shoe device, and a brake controller device operable to connect said four circuits to a source of current supply successively in the order enumerated.

5. In a vehicle brake system, in combination, four magnetic track shoe devices, each of said devices comprising a plurality of independent energizable windings, means for connecting in parallel groups the windings in one of said shoe devices with the windings in another of said shoe devices and thus forming as between said two shoe devices a plurality of parallel groups of windings, there being established such parallel groups between each pair of magnetic shoe devices, and a brake controller device for energizing first one parallel group of windings associated with one pair of shoe devices, and then another parallel group of windings associated with the other pair of shoe devices, and so on until all of said parallel groups of windings shall have been energized in a similar manner.

JOSEPH C. McCUNE.